United States Patent
Bergström et al.

(10) Patent No.: US 9,838,927 B2
(45) Date of Patent: Dec. 5, 2017

(54) DETERMINATION OF RADIO RESOURCE USAGE

(71) Applicant: Telefonaktiebolaget L M Ericsson (publ), Stockholm (SE)

(72) Inventors: Andreas Bergström, Vikingstad (SE); Jonas Fröberg Olsson, Ljungsbro (SE); Fredrik Gunnarsson, Linköping (SE); Daniel Henriksson, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 14/896,677

(22) PCT Filed: Jun. 13, 2013

(86) PCT No.: PCT/EP2013/062237
§ 371 (c)(1),
(2) Date: Dec. 8, 2015

(87) PCT Pub. No.: WO2014/198316
PCT Pub. Date: Dec. 18, 2014

(65) Prior Publication Data
US 2016/0142948 A1    May 19, 2016

(51) Int. Cl.
*H04W 36/00*    (2009.01)
*H04W 24/08*    (2009.01)
(Continued)

(52) U.S. Cl.
CPC ....... *H04W 36/0083* (2013.01); *H04W 24/08* (2013.01); *H04W 28/08* (2013.01); *H04W 36/22* (2013.01)

(58) Field of Classification Search
CPC ..... H04W 24/08; H04W 24/10; H04W 28/08; H04W 28/22; H04W 36/00; H04W 36/0083; H04W 36/22
See application file for complete search history.

(56) References Cited

U.S. PATENT DOCUMENTS 7,310,526 B2 * 12/2007 Sang ................ H04W 36/22
    455/436
8,594,672 B2 * 11/2013 Agrawal .......... H04W 36/0083
    370/331
(Continued)

FOREIGN PATENT DOCUMENTS

EP    2428090 A1    3/2012
WO    2005076946 A2    8/2005
(Continued)

*Primary Examiner* — Tri H Phan
(74) *Attorney, Agent, or Firm* — Coats & Bennett, PLLC

(57) ABSTRACT

There is provided a method for determining radio resource usage. The method is performed by a network node. The method comprises associating a bearer of a terminal device with a target bitrate. The method comprises estimating a spectral efficiency of the bearer. The method comprises acquiring a maximum radio resource usage. The method comprises determining radio resource usage of the bearer based on the target bitrate, the maximum radio resource usage, and the estimated spectral efficiency. A corresponding network node and a corresponding computer program are also provided.

24 Claims, 6 Drawing Sheets

(51) Int. Cl.
*H04W 28/08* (2009.01)
*H04W 36/22* (2009.01)

(56) References Cited

U.S. PATENT DOCUMENTS

| | | | | |
|---|---|---|---|---|
| 8,730,805 | B2* | 5/2014 | Arnott | H04L 5/0007 |
| | | | | 370/232 |
| 9,432,901 | B1* | 8/2016 | Kwan | H04W 36/245 |
| 9,516,084 | B2* | 12/2016 | Phillips | H04L 65/601 |
| 9,661,514 | B2* | 5/2017 | Coppage | H04W 24/08 |
| 9,668,171 | B2* | 5/2017 | Gupta | H04W 28/08 |
| 9,693,374 | B2* | 6/2017 | Arvidsson | H04W 76/02 |
| 2009/0046665 | A1 | 2/2009 | Robson et al. | |
| 2010/0254279 | A1 | 10/2010 | Choi et al. | |
| 2012/0014251 | A1* | 1/2012 | Arnott | H04L 5/0007 |
| | | | | 370/232 |
| 2013/0155966 | A1* | 6/2013 | Bekiares | H04W 28/16 |
| | | | | 370/329 |
| 2014/0355428 | A1* | 12/2014 | Smith | H04W 48/06 |
| | | | | 370/230 |

FOREIGN PATENT DOCUMENTS

| | | |
|---|---|---|
| WO | 2010078589 A2 | 7/2010 |
| WO | 2010128668 A1 | 11/2010 |
| WO | 2013045980 A1 | 4/2013 |

* cited by examiner

DETERMINATION OF RADIO RESOURCE USAGE

TECHNICAL FIELD

Embodiments presented herein relate to radio resource usage, and particularly to methods, network nodes and a computer programs for determining radio resource usage by a network node.

BACKGROUND

In cellular networks, there is always a challenge to obtain good performance and capacity for a given communications protocol, its parameters and the physical environment in which the cellular network is deployed.

In a cellular network where terminal devices (TDs) in a cell are served by network nodes there may be areas with high traffic, i.e. high concentration of TDs. By a TD is here meant a wireless user device, such as a user equipment (UE), mobile phone, etc. In such areas it is desirable to deploy additional capacity to ensure user satisfaction. The added capacity could be in the form of additional macro network nodes or network nodes with lower output power, such as micro network nodes or pico network nodes covering a particular area, thus concentrating the capacity boost to the particular area.

In the cellular network there may also be particular areas with coverage below a predetermined quality criterion where there thus may be a need for coverage extension. One way to mitigate this problem is to deploy a network node with low output power to concentrate the coverage boost to the particular areas. In general terms, a network node in the form of a so-called macro network node provides a wide area coverage (also called a macro cell). In the coverage area of the macro network node also low power network nodes could be deployed to provide small area capacity/coverage. Examples of such low power network nodes are so-called pico network nodes, relays and home network nodes (femto cells).

One argument for choosing network nodes with lower output power in the above scenarios is that the impact on the network as a whole may be minimized, e.g. for example concentrating any potential added interference of the network to the particular areas in which the additional network nodes with lower output power are deployed.

Additionally, there is currently a common drive in the direction towards the use of low power network nodes. The different terms used for these types of network deployments are Heterogeneous networks, multilayer networks or shortly HetNets. In such networks the underlay cells typically operate at lower reference (pilot/perch) signal powers compared to the macro cells. This means that if the cell selections as well as mobility decisions are based on received reference signal strengths, the downlink cell border is closer to the underlay network node than to the macro network node. If the uplink sensitivity for all cells is similar, or if the difference in uplink sensitivity is not equivalent to the difference in reference (pilot/perch) signal powers, then the uplink cell border will be different from the downlink cell border. This means that a TD served by the macro network node can have the best uplink to an underlay cell, causing extensive uplink interference even without having detected the underlay reference signal. Hence it may be difficult to provide a given service level in terms of e.g. throughput for the TD.

Hence, there is still a need for an improved radio resource usage determination in cellular networks.

SUMMARY

An object of embodiments herein is to provide improved radio resource usage determination in cellular networks.

The inventors of the enclosed embodiments have realized that in order to maximize the overall utilization of a radio access network, whilst still providing an adequate service to each of the individual connected TDs, it is in many cases needed to perform load sharing—i.e. that a given TD is moved to a cell which may not necessarily be the best one from a radio link perspective, but which has spare capacity and hence the overall system utilization is increased. The inventors of the enclosed embodiments have further realized that current handover decisions for load sharing reasons do not consider the impact a handover may have on the interference and load in the source and target cells, respectively. This will lead to inaccurate load estimation and improper load sharing decisions.

The inventors of the enclosed embodiments have further realized that one prerequisite for load sharing to work is to have a way of determining the current load situation of the considered cell(s). One way of achieving this is to use the ratio between the used and available radio resources as load figure. For some types of TD and traffic this could be sufficient, but for some traffic types that try to consume as much free resources as possible the load figure will be misleading. With these traffic types the cell may appear to be heavily loaded even though it would be possible for more TDs to share the resources in the cell without a substantial degradation of service quality. Another way of achieving this could be to, in a statistical manner, estimate the capacity of the cell as such—e.g. how many TDs a given cell may handle. This may be based on historic measurements etc. However, since the characteristics in terms of TD behavior, traffic patterns, terminal capabilities etc. are inherently different, such a statistical approach may not be accurate. An alternative approach would be to evaluate the load contribution that each and every TD would require in order to meet the required service level and only thereafter aggregate this load contribution that each and every TD would require in order to obtain the load figure for the cell(s).

A particular object is therefore to provide improved radio resource usage determination in cellular networks by determining the amount of radio resources that needs to be provided to a given bearer in order to provide a given service level in terms of e.g. throughput.

According to a first aspect there is presented a method for determining radio resource usage. The method is performed by a network node. The method comprises associating a bearer of a terminal device with a target bitrate. The method comprises estimating a spectral efficiency of the bearer. The method comprises acquiring a maximum radio resource usage. The method comprises determining radio resource usage of the bearer based on the target bitrate, the maximum radio resource usage, and the estimated spectral efficiency.

Advantageously the determined radio resource usage of the bearer may thereafter e.g. be used for subsequent input to load sharing mechanisms.

Advantageously, by considering measurements associated with a target cell and the TD, the predicted target radio resource unit usage becomes more accurate and valid for load balancing decisions. Moreover, feedback from the target cell about actual target cell radio resource unit usage may help to improve the prediction by enabling analysis of the prediction accuracy.

Yet another advantage is that the disclosed method may handle a dynamic target bitrate. This property could be used for services that have a variable bitrate during an active session. One example is web-surfing TDs or TDs that downloads a web-page and then starts to display the content thereof to a user. That type of service may be associated with one target bitrate during the downloading phase and another target bitrate during the displaying phase.

According to a second aspect there is presented a network node for determining radio resource usage. The network node comprises a processing unit. The processing unit is arranged to associate a bearer of a terminal device with a target bitrate. The processing unit is arranged to estimate a spectral efficiency of the bearer. The processing unit is arranged to acquire a maximum radio resource usage. The processing unit is arranged to determine radio resource usage of the bearer based on the target bitrate, the maximum radio resource usage, and the estimated spectral efficiency.

According to a third aspect there is presented a computer program for determining radio resource usage, the computer program comprising computer program code which, when run on a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third, and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
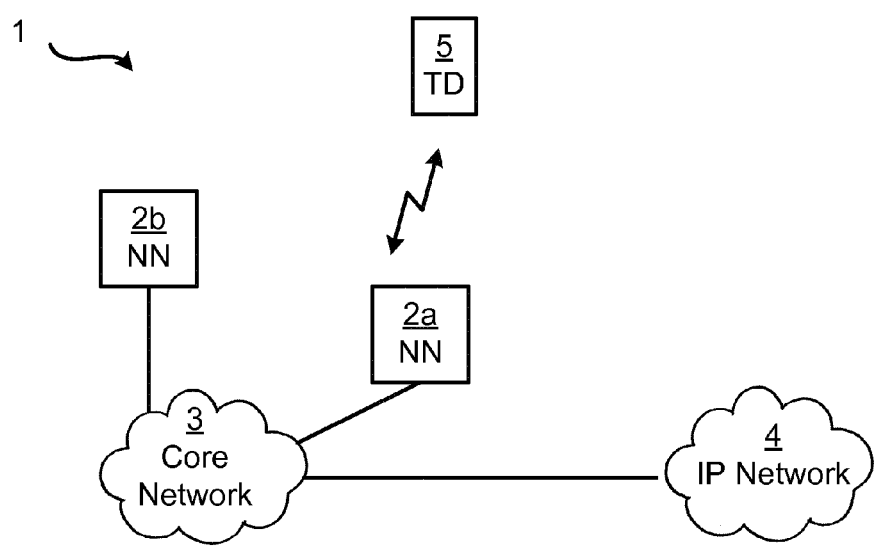
FIG. 1 is schematic diagrams illustrating a wireless communications system where embodiments presented herein may be applied.

FIG. 1 shows a schematic overview of an exemplifying wireless communication system 1. The wireless communication system 1 comprises network nodes 2a, 2b providing network coverage over cells (not shown). Each cell is served by at least one of the network nodes 2a-b. A terminal device (TD) 5, positioned in a particular cell is thus provided network service by the network node 2a-b serving that particular cell. Further, the network nodes 2a-b are arranged to communicate with other network nodes 2a-b via communications links. The network nodes 2a-b are also operatively connected to a core network 3. The core network 3 may provide services and data to the TD 5 operatively connected to at least one of the network nodes 2a-b from an external packet switched data network 4. As the skilled person understands, the wireless communications system 1a may comprise a plurality of network nodes 2a-b and a plurality of TDs 5 operatively connected to at least one of the plurality of network nodes 2a-b. Each network node comprises a first processing unit device 11a and a second processing unit device 11b, the functionalities of which will be further disclosed below. The communications system 1a may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, etc., as long as the principles described hereinafter are applicable.

In general terms, a cell may be associated with one or more of an operational carrier, a radio access technology, an antenna system, a transmission power, a pilot or reference signal, etc. A cell can also refer to the coverage area of a network node or antenna point, or the joint coverage area of multiple network nodes of antenna points. The cell can also be in operation to serve all, or only a subset of the TDs, in a coverage area of a network node. In the examples herein, all cells are associated with the same operational carrier and LTE as radio access technology. However, as the skilled person understands the herein presented inventive concept is equally applicable if the cells are differently configured.

The embodiments disclosed herein relate to radio resource usage determination. Particularly, in order to obtain radio resource usage determination there is provided a network node, a method performed by the network node, a computer program comprising code, for example in the form of a computer program product, that when run on the network node causes the network node to perform the method.

Figure 2:
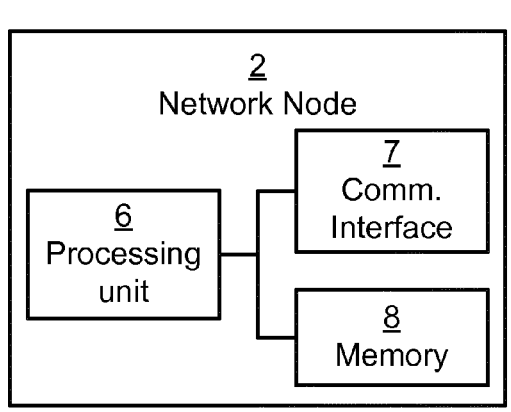
FIG. 2 is a schematic diagram showing functional modules of a network node.

FIG. 2 schematically illustrates, in terms of a number of functional modules, the components of a network node 2. A processing unit 6 is provided using any combination of at least one of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 9 (as in FIG. 3), e.g. in the form of a memory 2. Thus the processing unit 6 is thereby arranged to execute methods as herein disclosed. The memory 8 may also comprise persistent storage, which, for example, may be any single one or combination of magnetic memory, optical memory, solid state memory or even remotely mounted memory. The network node 2 may further comprise a communications interface 7 for receiving and providing information to other network nodes and for receiving and providing information to a TD 5. The communications interface 7 may thus comprise at least one transmitter and receiver, comprising analogue and digital components and a suitable number of antennae for radio communication with the TD 5. The processing unit 6 controls the general operation of the network node 2, e.g. by sending control signals to the communications interface 7 and the memory 8, and receiving reports from the communications interface 7 of its operation and by fetching instructions from the memory 8. Other components, as well as the related functionality, of the network node 2 are omitted in order not to obscure the concepts presented herein.

Figure 3:
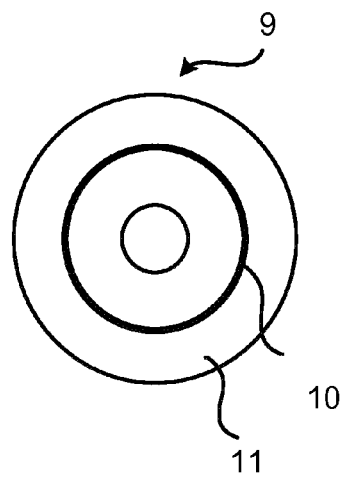
FIG. 3 shows one example of a computer program product comprising computer readable means.
Figure 4:
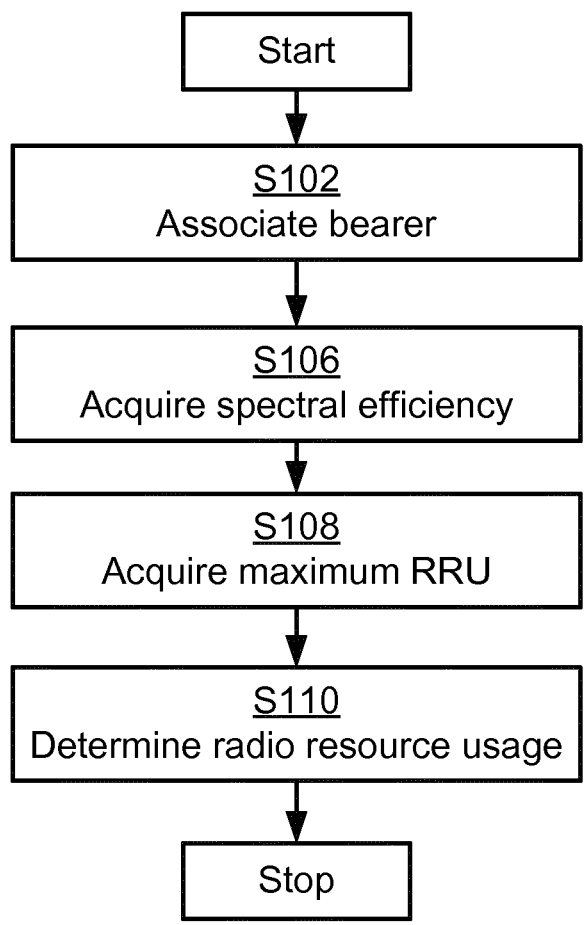
FIGS. 4 and 5 are flowcharts of methods according to embodiments presented herein.
Figure 5:
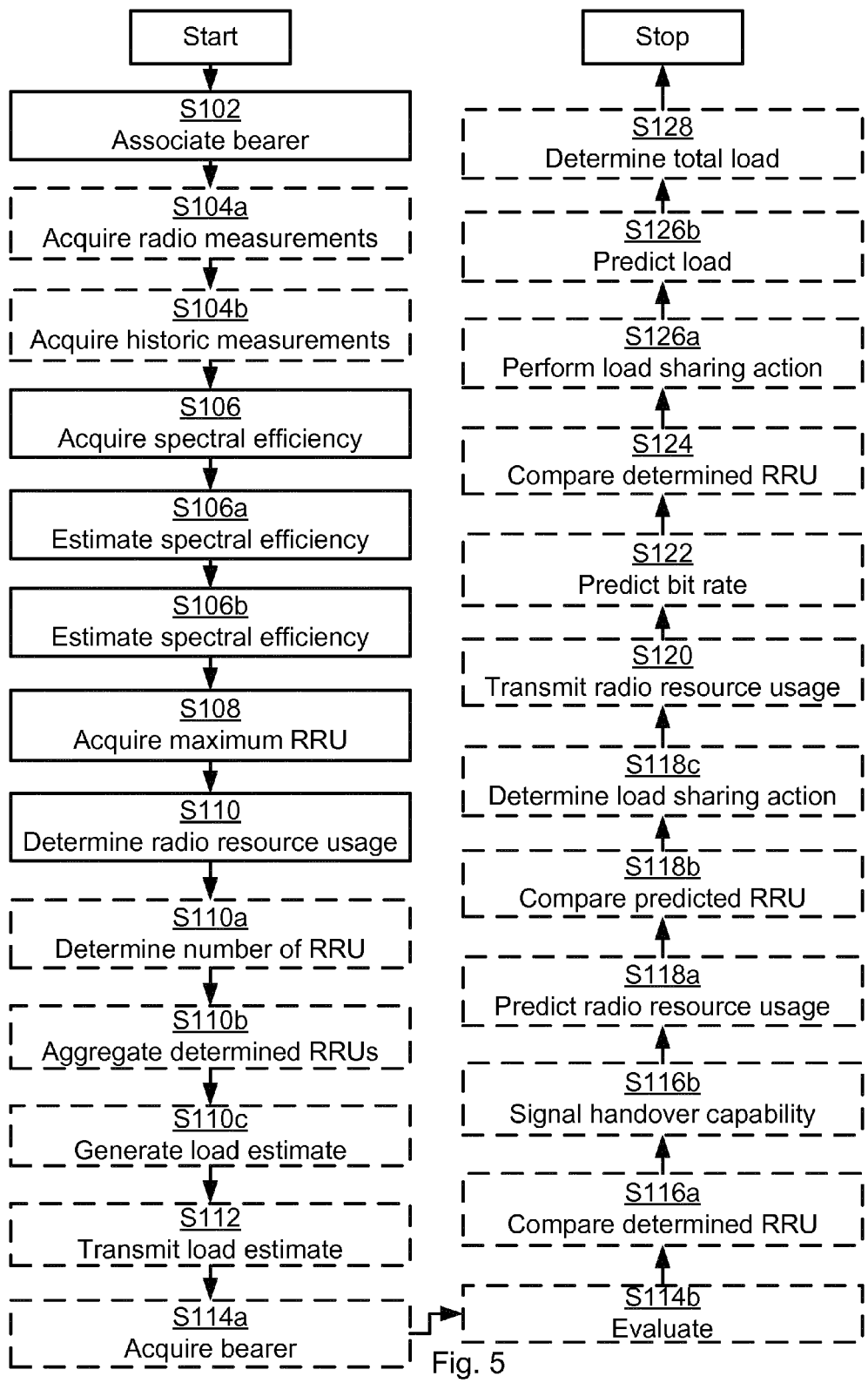

FIGS. 4 and 5 are flow charts illustrating embodiments of methods for determining radio resource usage. The methods are performed by the network node 2. The methods are advantageously provided as computer programs 10. FIG. 3 shows one example of a computer program product 9 comprising computer readable means 11. On this computer readable means 11, at least one computer program 10 may be stored, which at least one computer program 10 may cause the processing unit 6 and thereto operatively coupled entities and devices, such as the memory 8 and the communications interface 7 to execute methods according to embodiments described herein. In the example of FIG. 3, the computer program product 9 is illustrated as an optical disc, such as a CD (compact disc) or a DVD (digital versatile disc) or a Blu-Ray disc. The computer program product 9 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 10 is here schematically shown as a track on the depicted optical disk, the computer program 10 may be stored in any way which is suitable for the computer program product 9. The computer program 10 and/or computer program product 9 thus provides means for performing any steps as herein disclosed.

In general terms, the herein disclosed embodiments are based on determining radio resource usage of a bearer based on a number of acquired parameters. LTE is used as the exemplifying technology and in this case, one typical candidate for RU is the Physical Resource Blocks (PRB). In WCDMA (UTRAN), a typical candidate for RU is the allocated TTIs over HS-DSCH (the high speed downlink shared channel scheduled from the network node). For GERAN, an adequate RU candidate is similar, with the radio resources as time slots of at least one frequency carriers; in WiFi and GSM, as well as a generic radio network, a typical RU candidate is the fraction of used radio resources in a specific cell or from a specific antenna branch. The number of RUs may be considering the downlink situation, the uplink situation and/or both in combination.

A method for determining radio resource usage as performed by a network node 2, 2a, 2b comprises, in a step S102, associated a bearer of a terminal device 5 with a target bitrate. The association is performed by the processing unit 6 of the network node 2. The computer program 10 and/or computer program product 9 thus comprises means for associating the bearer.

The processing unit of the network node is further arranged to, in a step S106, acquire a spectral efficiency of the bearer. The computer program 10 and/or computer program product 9 thus comprises means for acquiring the spectral efficiency of the bearer.

The processing unit of the network node is further arranged to, in a step S108, acquire a maximum radio resource usage. The computer program 10 and/or computer program product 9 thus comprises means for acquiring the maximum radio resource usage maximum radio resource usage.

The processing unit of the network node is further arranged to, in a step S110, determine radio resource usage of the bearer based on the target bitrate, the maximum radio resource usage, and the estimated spectral efficiency. The computer program 10 and/or computer program product 9 thus comprises means for determining the radio resource usage of the bearer.

By the introduction of a target bitrate also for BE (best-effort) services (c.f. guaranteed bitrate for GBR (guaranteed bit rate) services), and a maximum resource unit usage target, the disclosed radio resource usage determination extends existing QoS (Quality of service) framework by allowing differentiation also between different BE bearers. The target bitrate and target maximum radio resource usage in turn, are used as an input to a method which, in the end, straightforwardly provides the needed amount of radio resources for this very bearer in order to achieve this target bitrate, in consideration of a maximum resource unit usage. In order to obtain the total cell load, the contribution amount for each bearer in the cell may be aggregated.

According to one embodiment the radio resource usage is, in an optional step S110a, determined as the minimum of the radio resource usage of the bearer based on the target bitrate, the estimated spectral efficiency, and the acquired maximum radio resource usage. The computer program 10 and/or computer program product 9 may thus provide means for performing this step of determining.

According to one embodiment the acquired radio measurements related to the terminal device are obtained by the network node, or received from either the terminal device or at least one other network node.

Target Bitrate

There are different ways to determining a target bitrate. Embodiments related thereto will now be described in more detail.

In general terms, each bearer may be associated with a target bitrate, which would correspond to a certain bitrate this bearer is considered to require. For a GBR (guaranteed bit rate) bearer this target bitrate is typically the guaranteed bitrate provided by the corresponding QoS configuration and/or CQI level. For a best effort bearer this target bitrate could be set e.g. per application, for example based on the TD subscription type and/or level, based on past and/or predicted TD behaviour and/or traffic etc. The target bitrate is hereinafter considered as a given parameter per bearer:

$$\text{TargetBitrate}_{Bearer} \text{ [bits/s]}$$

The target bitrate could also be considered to be a function, which makes it possible to capture variations in target bitrate. That is, according to an embodiment:

$$TargetBitrate_{Bearer} = k(\ldots) \text{ [bits/s]}$$

According to one embodiment $k(\ldots)$ is a function of bearer state (such as active/inactive) and type of bearer:

$$TargetBitrate_{Bearer} = k(BearerType, BearerState) \text{ [bits/s]}$$

Thus, according to an embodiment the target bitrate is dependent on bearer state and type of bearer, where the bearer state is switchable between an active state and an inactive state.

By using a target bitrate function it is, for example, possible to reflect the behavior of the bearer during inactivity, i.e. when the bearer is waiting for an inactivity time out.

As the skilled person understands, the function $k(\ldots)$ may contain more input parameters.

In one embodiment, a network node receives the target bitrate of a bearer, or receives a configuration of a target bitrate function of a bearer from another network node. This other network node may be a different network node, where the target bitrate is received via an inter-network node signaling interface or conveyed via an intermediate network node, a network control node such as a radio network controller, base station controller or similar, a core network node, such as a mobility management entity, a serving GSM or WCDMA support node, a mobile switching center etc., or an operations and maintenance system node In another embodiment, the network node receives, from the network node as exemplified above, a maximum RU usage, for example described as a maximum fraction of RUs the network node may assign to a bearer.

Measurements Associated with a Target Cell

There are different ways to associate measurements to the target cell and the TD. Embodiments related thereto will now be described in more detail.

Downlink Measurements Reported by the TD

In one embodiment, the target cell transmits a reference signal, and the TD is configured to measure and report measurements of the reference signal to its serving cell. Such measurements may be from reference signal received power (RSRP) signalling or reference signal received quality (RSRQ) signalling for E-UTRAN downlink, which may be extended to cases when more than one antenna is transmitting the reference signal. The reference signal may be a cell specific reference signal broadcasted to all TD, or dedicated reference signals intended for at least one specific TD.

Uplink Measurements Reported by the Target Cell

Figure 10:
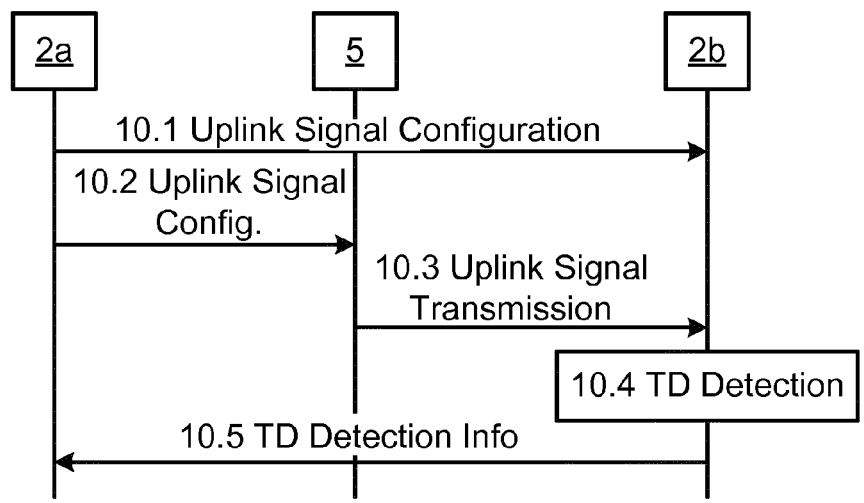
FIGS. 10, 11 and 12 are sequence diagrams of methods according to embodiments presented herein.

The TD may be configured to transmit its signals with a specific waveform. One example of such a waveform is channel sounding, where the TD is configured to transmit configured symbols at configured time-frequency radio resources. Another waveform is a random access preamble, which may be used for time synchronization in the uplink. If the target cell is informed about such uplink configurations, the target cell may determine the uplink radio conditions of the TD and report the uplink radio condition to the source network node. FIG. 10 illustrates an example of such signaling to support uplink measurements.

According to the uplink configuration and measurement reporting of FIG. 10 to enable association of target cell uplink measurements to the mobile terminal, a uplink signal configuration is in step 10.1 transmitted from the source network node 2a to a target network node 2b. Uplink signal configuration is then in a step 10.2 transmitted from the source network node 2a to the mobile terminal 5. Thereafter follows uplink signal transmission in a step 10.3 from the mobile terminal 5 to the target network node 2b. The target network node 2b in a step 10.4 performs detection of the mobile terminal 5 and in a step 10.5 transmits mobile terminal detection information to the source network node 2a. The computer program 10 and/or computer program product 9 may thus provide means for performing these steps 10.1-10.5.

Radio Resource Usage Reporting after Handover

Figure 11:
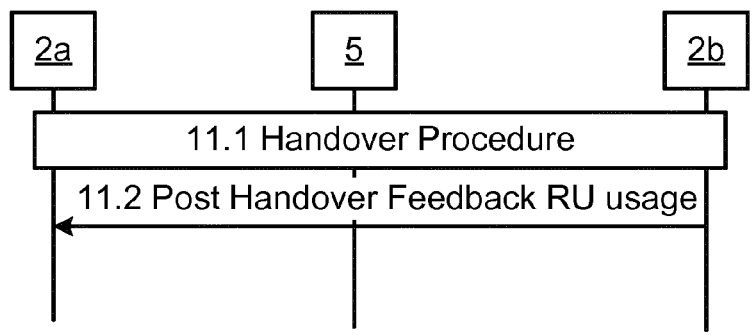

A target cell may be configured to report back to the serving cell the radio resource unit usage of a bearer of a TD after a completed handover. FIG. 11 describes how such signaling may be implemented as a feedback from a target network node 2b to a source network node 2a after a successful handover procedure from the source network node 2a to the target network node 2b. In a step 11.1 handover of the mobile terminal 5 is performed from the source network node 2a to the target network node 2b. In step 11.2 the target network node 2b transmits post handover feedback comprising radio resource usage of the mobile terminal 5 to the source network node 2a. The computer program 10 and/or computer program product 9 may thus provide means for performing these steps 11.1 and 11.2. Thus, according to one embodiment, the communications interface of the network node is arranged to, in an optional step S122, transmit the radio resource unit usage of the bearer to the network node from which the bearer was handed over. The computer program 10 and/or computer program product 9 may thus provide means for performing this step of transmitting. The step S122 is thus performed after handover of a bearer to this network node.

Enhanced Handover/Load Sharing Requests

Figure 12:
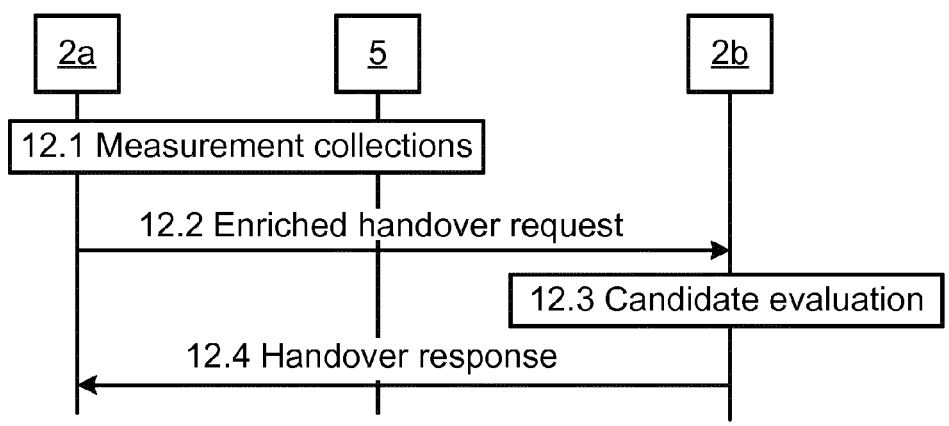

Bearer information and/or handover information may be compiled by the source network node and transferred therefrom to the target network node. At the target network node, the received information may be combined with information retrieved by the target network node itself. The combined information may be used to determine a predicted/estimated load contribution from the candidate TD. This may in turn be used to evaluate whether the target cell served by the network node may accommodate the candidate TD. Upon a positive evaluation, the handover response message contains a handover accept indication, while a negative evaluation triggers a handover reject indication. This is illustrated in FIG. 12. According to FIG. 11 measurement collections are in a step 12.1 performed by the source network node 2a and/or the mobile terminal 5. Thereafter an enhanced handover request is, in a step 12.2, transmitted from the source network node 2a to the target network node 2b. The target network node 2b then, in a candidate evaluation step 12.3 evaluates whether or not the mobile terminal 5 is a suitable candidate for load sharing. If determined to be a suitable candidate for load sharing the target network node 2b then, in a step 12.4, transmits a handover response to the source network node 2a to the enhanced handover request transmitted in step 12.2. The computer program 10 and/or computer program product 9 may thus provide means for performing these steps 12.1-12.4.

The response indication may also be soft, for example provided as a probability that the target bitrate may be fulfilled, or that fractions of the target bitrate may be fulfilled. This may also be represented as percentiles of the target bitrate. Alternatively, the indications may be with respect to a minimum bitrate.

Spectral Efficiency Determination (Prediction/Estimation)

There are different ways to determine (estimating and/or predicting) the spectral efficiency of the bearer.

Embodiments related thereto will now be described in more detail.

According to a first embodiment the processing unit of the network node is arranged to, in an optional step S104a, acquire radio measurements related to the bearer, and in a further optional step S106a, estimate the spectral efficiency of the bearer based on the acquired radio measurements. The computer program 10 and/or computer program product 9 may thus provide means for performing these step of acquiring and estimating.

According to a second embodiment the processing unit of the network node is arranged to, in an optional step S104b, acquire historical radio resource usage and bitrate related to the bearer, and in a further optional step S106b, estimate the spectral efficiency of the bearer based on the acquired historical radio resource usage and bitrate. The computer program 10 and/or computer program product 9 may thus provide means for performing these step of acquiring and estimating.

In general terms the spectral efficiency may be expressed as:

$$\text{BitratePerRU}_{Bearer} = f(\ldots) \text{ [bits/s/RU]}$$

Thus the spectral efficiency of the bearer may be provided as bits per radio resource unit.

According to a first set of embodiments, in its simplest form, $f(\ldots)$ may be predicted based on measurements associated to the target cell and the TD.

In one embodiment, the function may be generated as a mapping between serving cell radio condition measurements reported by the TD to the serving cell together with bit rate values for the same or similar radio resources. The bit rate values may either be obtained from scheduled bit rate, or be based on the reported channel quality indicators from the TD indicating which bit rate that the mobile considers appropriate. The mapping could with be unique per TD or general for the whole cell, or a mapping per group of TDs with the same capabilities, traffic type etc.

According to one embodiment the processing unit of the network node is therefore arranged to, in an optional step S120, predict bit rate per radio resource unit based on the acquired radio measurements of the terminal device. The computer program 10 and/or computer program product 9 may thus provide means for performing this step of predicting.

The radio condition measurements may be provided by reference signal received power (RSRP) signalling or reference signal received quality (RSRQ) signalling for E-UTRAN downlink transmissions, which may be extended to cases where more than one antenna is transmitting the reference signal. The reference signal may be a cell specific reference signal broadcasted to all TD, or dedicated reference signals intended for at least one specific TD. Such data may be used to construct a lookup table from radio condition measurement to bitrate per radio resource unit. That is, according to one embodiment:

$$\text{BitratePerRU}_{Bearer} = f(\text{RadioConditionMeasurement}) \text{ [bits/s/RU]}$$

In general terms, in communications systems employing separation of radio resources used for pilot symbols and for data transmission, the measurements reflect the reference symbol radio condition, which not necessarily is the same as the data symbol radio conditions. This could be the case, for example, in LTE downlink transmissions where a reference symbol is always transmitted at its assigned radio resource unit, while data transmission radio resource units are not always in use. This also means that the interference contribution in downlink generally depends on how often the interfering cell is transmitting data, or rather the probability that a radio resource unit is in the interfering cell is used for data transmission. In general terms, for the uplink the contribution is given by a combination of the probability and received power from a TD at the network node.

In another embodiment, the interference level in an associated measurement is not considered representative of the expected interference level after a completed handover. One further example is if at least one of the network nodes protects specific radio resources by avoiding scheduling data in such resources, or by scheduling data at a reduced power. One such example is almost blank subframes (ABS), where a network node avoids scheduling data in certain time slots (or considers a reduced power level). That is, according to one embodiment all radio resources in the strict subset of radio resources are associated with almost blank subframes or reduced power subframes configurations of at least one cell in the network.

Another example is if at least one network node avoids scheduling data in certain frequency bands or subbands (or considers a reduced power level). Resources protected by blanking may be regarded as a zero probability that the interfering network node or the associated TDs will transmit data.

If a TD is expected to be scheduled in the target cell at such a protected resource, or that the probability that an interfering network node will transmit data is less than unity, then this scheduling is according to an embodiment considered when predicting the spectral efficiency at the target cell. To exemplify, the following E-UTRAN specific notation, with values in linear scale, is introduced. However, as the skilled person understands, the embodiments are likely applicable to radio access networks different from E-UTRAN. In the following exemplifying disclosure, quantities are defined with respect to a specific reference point. One typical downlink reference point is before antenna combinations (at the antenna connector), but other reference points are equally possible. It is even possible to combine different reference points, provided that the difference between reference points is considered properly. For simplicity and without limitation, it is assumed that there is no power offset between pilot symbols and data symbols. Let:

RSRP(src)=measured and reported serving cell RSRP of the TD

RSRP(tgt)=measured and reported target cell RSRP of the TD

RSRQ(src)=measured and reported serving cell RSRQ of the TD

RSRQ(tgt)=measured and reported target cell RSRQ of the TD

Pow(src)=transmission power at the serving cell

Pow(tgt)=transmission power at the target cell

Pow,red(src)=reduced transmission power at the serving cell (may be zero)

Prob(src)=probability that the serving cell will transmit in a time/frequency resource used by the target cell Prob(tgt)=probability that the target cell will transmit in a time/frequency resource used by the serving cell Prob,pred(tgt)=probability that the target cell will transmit in a time/frequency resource used by the serving cell after a potential handover of a TD to the target cell
MaxAvailRU=Max available radio resource units
Prob_UE(src)=probability that the TD will transmit data while being served by the serving cell
Prob_UE(tgt)=probability that the TD will transmit data while being served by the target cell
UL_Int(src)=received interference in serving cell
UL_Int(tgt)=received interference in target cell
UL_Gain_Diff=relative path gain difference The estimated interference in the downlink over the reference signal when served by the serving cell may be determined from the reference signal measurements as follows:

$$Irs(src)=RSRP(src)/RSRQ(src)$$

In general terms, the estimated interference may depend on whether cells have aligned pilot symbols or not. In a non-aligned system, the expression above is representative, and in an aligned system, the expression represents an upper bound.

The predicted average interference over the data symbols in the downlink when served by the target cell is a function of the serving cell reference signal interference level, but is also reduced since the estimated interference over the serving cell reference symbols is also affected by data transmissions from the target cell. This contribution will not be present when served by the target cell. Furthermore, the estimated interference is also reduced since the serving cell is not always transmitting interfering data symbols. In case of protected resources, the interference contribution from the serving cell may either be avoided or reduced by using a reduced transmission power during protected resources. In summary, this may be expressed as:

$$I\text{data, pred}(tgt) = Irs(src) - RSRP(tgt) \cdot Prob(tgt) -$$
$$RSRP(src) \cdot (1 - Prob(src) \cdot Pow, \text{red}(src)/Pow(src))$$

In brief, the predicted data interference at target cell is thus the estimated interference at serving cell reference signals (first line) excluding the interference contribution from target cell data transmissions (second line), as well as excluding interference contributions from serving cell data transmissions that are not expected (third line).

In general terms, Prob(tgt) refers to the data transmission probability of the target cell before the handover, whilst Prob(src) is the probability of the serving cell after the handover. If the serving cell is highly loaded, this latter probability may be estimated by the probability before the handover. Both probabilities may be estimated as the radio resource unit usage fraction in source and target cell respectively. In detail, different resources are subject to different usage systematically. Resources used for pilot symbols, synchronization symbols, system information, etc. remain at the same resources and have full usage. Resources used e.g. for interference measurements are blanked and never used. Resources used for data and control signaling have a usage that depend on the traffic load. The determination of the total usage may thus have to consider these aspects.

Some specific cases are hereinafter disclosed where, in general, the target cell data transmission interference is predicted as a function of arguments comprising the serving cell reference signal estimated interference, target cell downlink reference signal received power, target cell data transmission probability, serving cell downlink reference signal received power, serving cell data transmission probability, and serving cell protection strategies.

In the uplink there are some differences in the estimation. The uplink transmission power is according to an embodiment updated according to $$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

where $P_{CMAX,c}(i)$ is the maximum TD power, $M_{PUSCH,c}(i)$ is the bandwidth of the PUSCH resource assignment expressed in number of resource blocks, $P_{O\_PUSCH,c}(j)$ indicates target received uplink power, $\alpha_c(j)$ is the fractional pathloss compensation factor, and $PL_c$ is the estimated pathloss based on downlink measurements.

It is here assumed that the TD power control uses full path-loss compensation ($\alpha=1$) with a received power target $P_O$, and that all TDs achieve this target, i.e. the TDs are only allocated PRBs in relation to the path-loss. This is not necessary but will simplify the terminology. Consideration of fractional path loss compensation may also be considered. For fractional path loss compensation, the received power at the network node would be needed. This received power may be estimated by the network node using measurements on the UL transmissions from the TD, the TD maximum power and the allocation bandwidth.

It is here further assumed that the load is sufficiently low, i.e., that the UL is not fully loaded. However, also fully loaded TDs may be handled in a similar manner. The predicted values may be determined as follows. First the predicted interference level after handover to a target cell is derived according to:

UL_Int_post(src)=UL_Int(src)+Prob_UE(tgt)·Po(tgt)/(UL_Gain_Diff)

UL_Int_post(tgt)=UL_Int(tgt)−Prob_UE(src)·Po(src)·(UL_Gain_Diff)

The UL_Gain_Diff may be estimated as the ratio (in linear scale):

UL_Gain_Diff=(RSRP(src)/Pow(src))/(RSRP(tgt)/Pow(tgt))

No Protected Resources

In this case, the predicted target cell data interference is reduced by the target cell interference contribution, as well as by the fact that the serving cell will not always contribute with data interference. Hence, Pow,red(src)=Pow(src), and $I$data,pred(tgt)=Irs(src)−RSRP(tgt)·Prob(tgt)−RSRP(src)·(1−Prob(src))

Protected Resources

In case the resources are protected by reduced power levels, then the most general expression above applies. However, if considering zero power protection, then the expression is simplified by having Prob(src)=0, which implies:

$I$data,pred(tgt)=Irs(src)−RSRP(tgt)·Prob(tgt)−RSRP(src).

Predicted Data Symbol Radio Conditions

The predicted data symbol signal to interference and noise ratio when served by the target cell may be predicted as $$SINRdata,pred(tgt)=RSRP(tgt)/Idata,pred(tgt)$$

In general, the expected interference reduction is a function of the serving cell power level during protected and unprotected radio resources.

Measurement Resource Configuration

In an alternative embodiment, the TD may be configured to only measure the target cell during protected resources in order to avoid any influence from the serving cell at full power. Thereby, the measured and reported radio conditions become more representative. However, the influence from the data transmission probabilities still is present. This means that according to one embodiment the contribution from the target cell to the serving cell reference signal measurement needs to be removed, while the serving cell data contribution needs to be added. Thus:

$$Idata,pred(tgt)=Irs(src)-RSRP(tgt)-Prob(tgt)+ \\ Prob(src)-RSRP(src)-Pow,red(src)/Pow(src)$$

Hence, when using protected resources, the predicted spectral efficiency may be based on a mapping from adjusted radio conditions, or from radio conditions measured only during protected resources to account for the expected interference reduction.

Uplink

In a similar way as described for the downlink, uplink radio condition measurements may be mapped to uplink bitrate per radio resource unit. The uplink radio condition measurements may be gathered when the TD is transmitting a specific waveform. One example of such waveform is channel sounding, where the TD is configured to transmit configured symbols at configured time-frequency radio resources. Another waveform is a random access preamble, used for time synchronization in the uplink.

For the purpose of estimating uplink bitrate each TD can, in one embodiment, be assumed to have the same SIR. This may change if consideration to frequency-time-domain variations, due to, for example, fast fading or TD protection in the form of ICIC, are also taken into account. In the introduced terminology the wideband SIR would prior to handover be:

$$SIR\_before(src)=Po(src)/UL\_Int(src)$$

$$SIR\_before(tgt)=Po(tgt)/UL\_Int(tgt)$$

The wideband SIR would post handover be:

$$SIR\_post(src)=Po(src)/UL\_Int\_post(src)$$

$$SIR\_post(tgt)=Po(tgt)/UL\_Int\_post(tgt)$$

In a practical implementation either the wideband SIR or the interference estimated could be adjusted taking into account, for example, frequency domain diversity and interference suppression capability of the source network node. Interference suppression capability may vary between a simple Pico network node and an advanced Macro network node.

The above disclosed prediction algorithms and used mappings may be considered for all bearers and TDs, but may also be different for different bearers and/or TD capabilities and used services. For example, TDs with different receiver capabilities may be separated into different mappings. Further, for example the algorithm for estimating probabilities may take into account service type and consider VoIP (which will not increase/decrease transmission bit-rate compared to best-effort file download, which in turn may increase/decrease its used bit-rate significantly).

Thus, according to one embodiment the network node is a non-source network node (i.e., a target network node) of the terminal device. The processing unit 6 of the network node 2 may then be arranged to, in an optional step S116a, compare the determined radio resource usage to radio resources available to the non-source network node. The computer program 10 and/or computer program product 9 may thus provide means for performing this step of comparing. The communications interface 7 may then be arranged to, in an optional step S116, signal a handover capability of the bearer to a source network node of the bearer based on the comparison. The computer program 10 and/or computer program product 9 may thus provide means for performing this step of signalling. This handover capability may comprise information that the bearer and/or mobile terminal 5 can be accommodate by the non-source network node.

In another embodiment, the mapping is updated based on feedback from previous target cells. Such feedback may be used to compare the predicted spectral efficiency with the actual spectral efficiency after a completed handover. The adjustments may be made for all target cells, bearers and TD capabilities, but it may also be different for different target cells and/or bearers and/or TD capabilities.

Thus, according to one embodiment the processing unit 6 of the network node 2 is arranged to, in an optional step S118a, predict radio resource usage for at least one bearer served by the network node; in an optional step S118b, compare the predicted radio resource usage to current radio resource usage of the network node; and in an optional step S118c, determine a load sharing action based on the comparison. The computer program 10 and/or computer program product 9 may thus provide means for performing these steps of predicting, comparing, and determining.

According to a second set of embodiments, in its simplest form, f( . . . ) may be estimated based on historic measurement on the bitrate and used RUs for this bearer as:

$$f(\ldots) = f(MeasuredRUusage_{Bearer}, MeasuredBitrate_{Bearer},) = \frac{MeasuredBitrate_{Bearer}}{MeasuredRUusage_{Bearer}}$$

Figure 6:
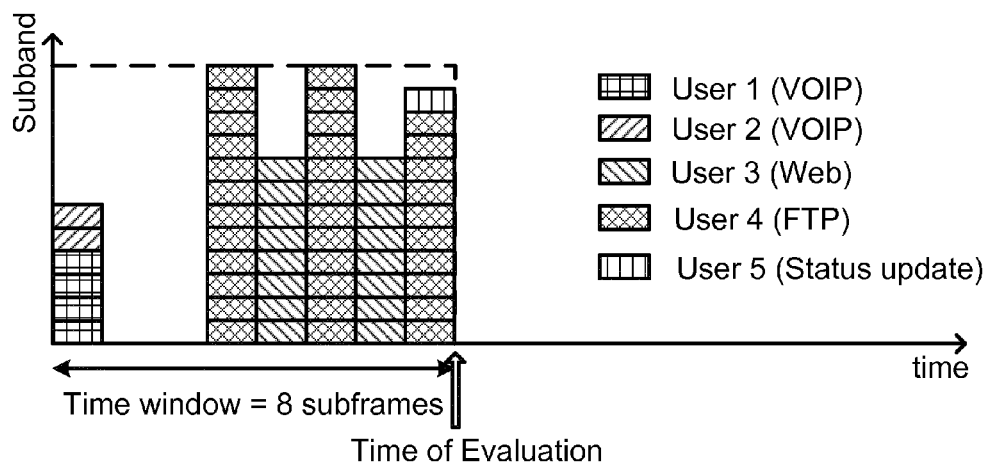
FIG. 6 schematically illustrates a number of Physical Resource Blocks used over time.

Here, MeasuredRUusage$_{Bearer}$ and MeasuredBitrate$_{Bearer}$ are calculated during a given time window as illustrated in FIG. 6. FIG. 6 schematically illustrates the amount of PRBs used by a number of bearers, users, and/or flows (in FIG. 6 denoted users 1-5) in a cell for each subframe during a given time window. As will be disclosed below, these measurements may be transformed into time window averages.

An equivalent alternative is obtainable by determining the ratio between the sum of the RU usage and the sum of the bitrate over these RUs per bearer/UE. This may be expressed as follows:

$$f(\ldots) = f(SumRUusage_{Bearer}, SumBitrate_{Bearer}) = \frac{SumBitrate_{Bearer}}{SumRUusage_{Bearer}}$$

This means that measurements are considered for at least one current and/or previous time instants.

The total bitrate of the same time window and RUs may be determined by summing the bitrate over these radio resource units per bearer and/or TD.

According to another embodiment within the present second set of embodiments the channel state feedback (channel quality indicator, CQI and rank) and transport format settings into account. That is, f( . . . ) may be expressed as:

$$f(\ldots) = f(CQI, rank, MeasuredPRBusage_{Bearer}, MeasuredBitrate_{Bearer}) = \ldots = f(g(CQI, rank), h(MeasuredPRBusage_{Bearer}, MeasuredBitrate_{Bearer}))$$

This will give bitrate estimates for all RUs where a TD has provided feedback of channel state information In the expression above g(CQI, rank) denote the throughput as would at this very instant be commanded by a link adaptation algorithm in terms of transport block size, modulation and coding. The factor h(MeasuredPRBusage$_{Bearer}$,MeasuredBitrate$_{Bearer}$) denotes the part which is based on historic measurements as described earlier.

The exact and/or more refined versions of f( . . . ), g( . . . ) and h( . . . ) is however considered outside the scope of the present disclosure.

Radio Resource Usage Need

There are different ways to determine the radio resource usage need of the bearer in step S110. The target radio resource usage need may consider the amount of PRBs, subbands, time slots etc. that the given bearer would require in order to achieve the earlier described target bitrate, for example in terms of a prediction when served by the target cell (or as a determination when served by the original serving cell). Embodiments related thereto will now be described in more detail.

In one embodiment, the target RU usage need for the target cell is predicted based on the target bitrate and the spectral efficiency prediction as follows:

$$TargetRUusage_{Bearer} = \frac{TargetBitrate_{Bearer}}{BitratePerRU_{Bearer}} [RUs]$$

In another embodiment, the bearer is configured with a maximum RU usage for the target cell as follows:

$$TargetRUusage_{Bearer} = \min\left(MaxRUusage_{Bearer}, \frac{TargetBitrate_{Bearer}}{BitratePerRU_{Bearer}}\right)$$

According to one embodiment the total cell load is determined. The processing unit 6 of the network node 2 may therefore be arranged to, in an optional step S128, determine a total load of a cell served by the network node as the number of required radio resource units needed to fulfil the target bitrate for all bearers in the cell. The computer program 10 and/or computer program product 9 may thus provide means for performing this step of determining.

The cell load may be determined as the total RU usage needed for all bearers in the cell to meet their target bitrates as follows:

$$\text{Cell Load} = \frac{1}{AvailableRUusage} \sum_{\forall Bearers} TargetRUusage_{Bearer}$$

The factor AvailableRUusage [RUs/s] refers to the number of available RUs per second in the cell.

In one embodiment, the available number of RUs per second is equal to the total number of RUs in the cell per second.

In another embodiment, the available number of RUs per second may be expressed as:

$$AvailableRUusage = TotalRUusage \times \min\left(1.0, \frac{MaxCellBitrate}{\sum TargetBitrate_{Bearer}}\right)$$

In this expression, TotalRUusage [RUs/s] is the total amount of available RUs per second in the cell for TD plane payload (i.e. signalling on the physical downlink shared channel, PDSCH, or the physical uplink shared channel, PUSCH). Further, MaxCellBitrate may be regarded as a limitation on the total bandwidth of the cell as could be dependent on e.g. backhaul limitations.

Source Cell Interference Prediction

In one embodiment, the determined resource unit usage may be compared to the amount of available resources in the target cell, and thereby provide an indication of whether the TD may be accommodated by the target cell or not.

Thus, according to one embodiment the processing unit 6 of the network node 2 is arranged to, in an optional step S114a, acquire the bearer by receiving identification of the terminal device 5 and bearer information from a network node (such as a target network node) of the terminal device 5. The computer program 10 and/or computer program product 9 may thus provide means for performing this step of acquiring. The processing unit 6 of the network node 2 may then be arranged to, in an optional step S114b, evaluate whether a network node not serving the bearer (i.e., a target network node) can accommodate the bearer or not based on the received identification of the terminal device and the bearer information. The computer program 10 and/or computer program product 9 may thus provide means for performing this step of evaluating.

In another embodiment, the determined resource unit usage may be used for predicting the situation in the serving cell in case a load sharing action has been completed in order to ensure that the load sharing leads to an overall performance improvement of the cellular communications network. This may imply that the interference situation of the remaining TDs in the serving cell should be predicted.

Thus, according to one embodiment the processing unit 6 of the network node 2 is arranged to, in an optional step S124, compare the determined radio resource unit usage to the amount of available radio resources in a cell served by the network node. The computer program 10 and/or computer program product 9 may thus provide means for performing this step of comparing.

A load sharing action may then be performed based on the determined radio resource usage of the bearer. Thus, according to one embodiment the processing unit 6 of the network node 2 is arranged to, in an optional step S126a, perform a load sharing action based on the determined radio resource usage of the bearer, and, in an optional step S126, predict a load in a cell served by the network node after having performed the load sharing action. The computer program 10 and/or computer program product 9 may thus provide means for performing these steps of load sharing and predicting.

If resources are protected with some protected resources refrained from being used in the source cell, and the TD under scrutiny is considered for a protected resource at the target cell, then there will be no impact from TDs that are moved from the source cell on the TDs remaining at the source cell. This is the case since the TD will be assigned different resources in the target cell compared to the source cell. One example of this situation is for ABS when the source cell is a Macro cell and the target cell is a Pico cell. In this case if the TD is assigned to a protected subframe (blanked subframe in the Macro cell) the TD is scheduled in subframes when no TD is scheduled in the Macro cell. Hence the interference created by transmitting to the TD in the Pico cell does not impact any TD in the Macro cell as the Macro cell is blanked. The same applies to when serving and target cells are assigned different operational carriers.

If the resources are not protected, or the considered TD is not subject to protected resources, then the source network node will increase the resource unit usage at resources that will interfere with the remaining TDs in the serving cell.

By using the TargetRUusageBearer of the TD in the target cell, it is possible to estimate the load, or the resource unit usage in the target cell. This is the Prob,pred(tgt):

$$Prob,pred(tgt)=Prob(tgt)+sum(TargetRUusageBearer)/MaxAvailRU$$

Then, for each remaining TD i in the serving cell:

$$Irs,i(src)=RSRP,i(src)/RSRQ,i(src)$$

The increase in interference may then be determined as $$Irs,pred,i(src)=Irs(src)+RSRP,i(tgt)*(Prob,pred(tgt)-Prob(tgt))=Irs(src)+RSRP,i(tgt)*sum(TargetRU-usageBearer)/MaxAvailRU$$

In the serving cell it is possible to maintain an outer loop offset between the interference received at the pilot symbols and the data symbols. It is typically driven by observing CQI reports and transmission success rate for data transmission. Therefore, such a mapping may be considered to be maintained for on-going connections in the serving cell. This leads to a mapping from Irs,i(src), RSRP,i(src) and RSRQ,i(src) to data symbol SINR (Signal to noise and interference ratio) and spectral efficiency, from which the resource unit usage may be determined as disclosed for the target cell predictions above.

Thereby, it is possible to compare to the current resource unit usage, and analyze whether the load sharing decision is beneficial from a multi-UE perspective.

Observability

In the current LTE specifications, network nodes aggregate RU usage over a time window and report the aggregated RU usage to other network nodes. Thus, according to one embodiment the processing unit 6 of the network node 2 is arranged to, in an optional step Snob, aggregate the determined radio resource usage over a set of bearers, and in an optional step S110c, generate a load estimate for the set of bearers based on the aggregated determined radio resource usage. The computer program 10 and/or computer program product 9 may thus provide means for performing these steps of aggregating and generating. The set of bearers may be associated with a terminal device where the load contribution may be considered per terminal device. Additionally or alternatively the set of bearers may be associated with a network node where the load contribution additionally or alternatively may be considered per network node (or transmission point).

In one embodiment, the network node may thus be configured by another network node to aggregate the cell load in consideration of the target bitrate and max resource unit usage target. This cell load reflects the relation to the bearer targets and limitations, and may be provided to other network node and nodes. The aggregation may also be separated over different resource unit sets.

The network nodes includes other network nodes, but also network nodes in other radio access technologies, core network nodes and operations, admin and management system nodes. The load estimate may be transmitted to any of these network nodes. According to one embodiment the communications interface 7 of the network node 2 is therefore arranged to, in an optional step S112, transmit the load estimate to at least one other network node. The computer program 10 and/or computer program product 9 may thus provide means for performing this step of transmitting.

The enclosed embodiments may thereby better reflect the load of a cell in relation to the target needs, compared to current methods which mainly reflect the resource unit usage. By considering observability of resource unit usage, the network operator may be provided with a more accurate view of the system load.

Radio Resource Units with Distinct Characteristics

In one embodiment, the available radio resource units (RUs) in the cell may be considered as belonging to multiple distinct sets with respect the radio environment a TD will experience on these resources. That is, the radio resource usage may be restricted to a strict subset of radio resources.

One such example in the case of E-UTRAN is the usage of ABS (Almost Blank Subframes) in which an interfering (aggressor) cell may omit transmission on the PDCCH/PDSCH in order to mitigate the interference from the interfered (victim) cell during certain subframes. Hence, these subframes will be considered as being protected from interference and may be seen as a separate set of resources with a characteristic different from the rest. A variant of ABS is to allow transmission on the PDCCH/PDSCH, but at reduced power.

Another example is that part(s) of the used E-UTRAN frequency band is heavily influenced by external interference, and may thus be seen as another separate set of resources with different characteristics. That is, all radio resources in the strict subset of radio resources may be associated with common interference conditions.

Separate bookkeeping of these different sets of resources may be kept. For example, the spectral efficiency determination may be different between these different set of resources. Also the total cell load determination may be be monitored and managed separately for these distinct sets of radio resource units.

Illustrative Simulation

Figure 7:
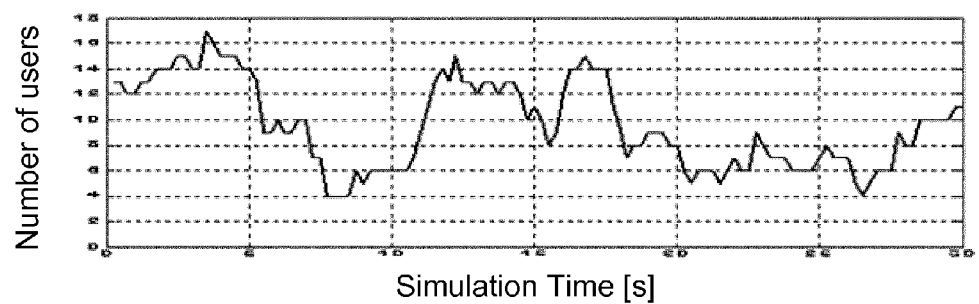
FIGS. 7, 8 and 9 are simulation results.

Consider now the following illustrative simulation in an E-UTRAN/LTE cell with 50 subcarriers and with a number of TDs varying over time as per FIG. 7.

Figure 8:
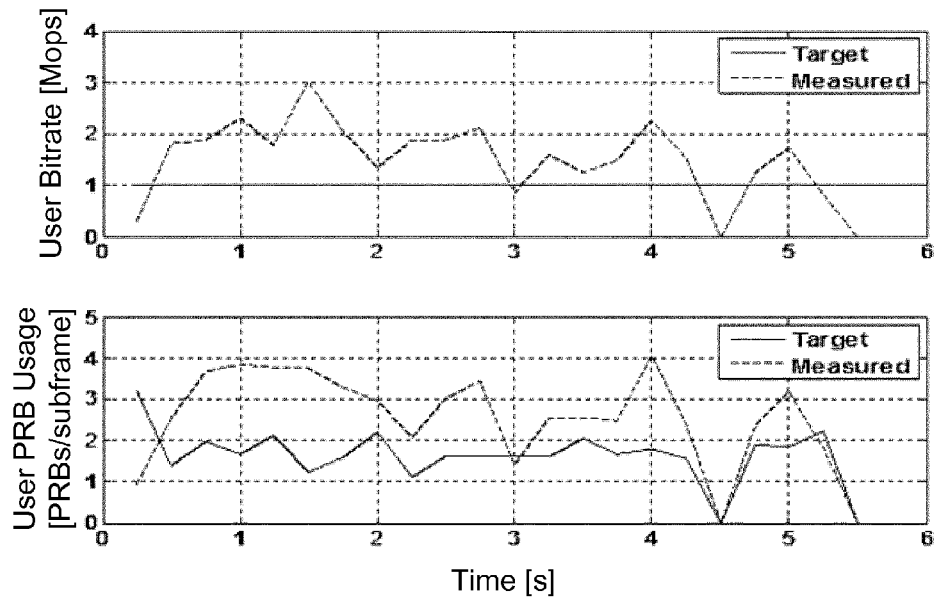

Each TD in the simulation has in the present non-limiting example been configured with one bearer each which all has a target bitrate of 1 Mbps. This TargetBitrate$_{Bearer}$ is shown with a solid line together with the MeasuredBitrate$_{Bearer}$ shown in a dashed line in the upper part of FIG. 8. The lower part of FIG. 8 shows in a dashed line the MeasuredPRBusage$_{Bearer}$. The solid line in this part of FIG. 8 is the TargetPRBusage$_{Bearer}$.

Figure 9:
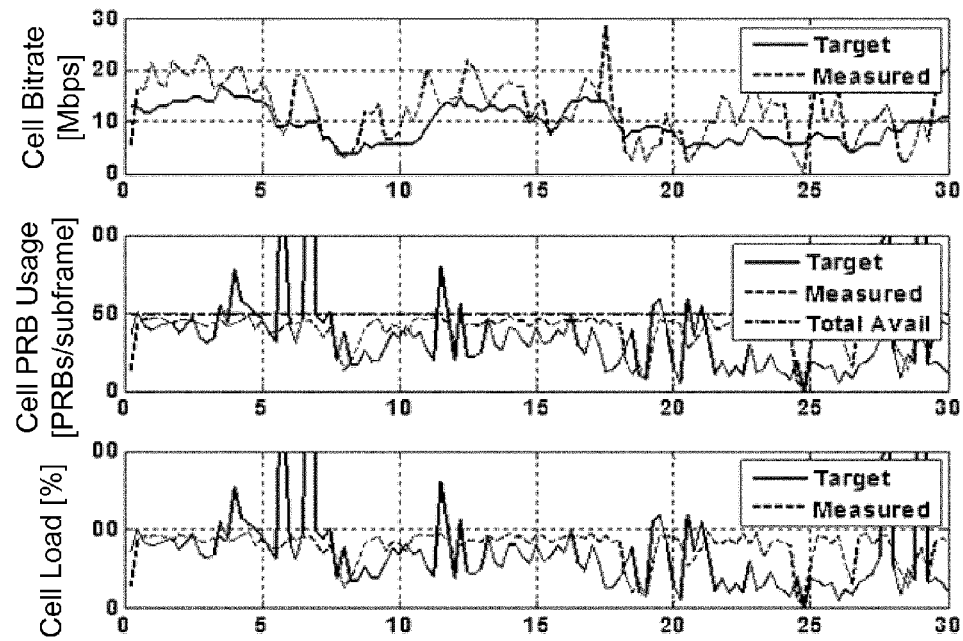

The aggregated target (solid) and measured/average (dashed) bitrates and PRB usages for all bearers in the cell is shown in the top and middle parts of FIG. 9. The solid curve in the lower part of the figure shows the 'target' cell load, i.e. the cell load as given by the aggregate target PRB usage as described earlier. The dashed curve is the de-facto load, i.e. the amount of resource actually used.

Note that there are both instances when the target load is larger than the measured load (hence indicating an overload situation) but also situations when the measured load is larger than the target load (hence indicating spare capacity in the cell which have been utilized to serve bearers with extra resources).

In summary, the enclosed embodiments has a robustness towards single (or few) estimation errors, since the determinations are based on TD level instead of cell level. When on a cell level determining parameters from estimations there is a risk that an error in an estimated parameter creates a large impact. If for example the maximum cell capacity is estimated for a cell by using cell statistics or historical measurements, as disclosed above, an estimation error by a few percent could lead to an equally large error in the cell load. When estimating load for each individual TD, as disclosed herein, a single estimation error potentially would not impact the cell load calculation as much.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, certain of the disclosed embodiments have related to on load sharing from a serving cell to a target cell on the same frequency using the same radio access technology. However, as is readily appreciated by a person skilled in the art the inventive concept is also applicable to scenarios relating to transmission and/or reception point selection in shared cell scenarios, bearer handover decisions in dual connectivity scenarios, and inter-RAT (radio access technology) load sharing decisions in multi-RAT scenarios, where RATs include, but are not limited to, GERAN, UTRAN, WiFi, WiMAX, etc.

The invention claimed is:

1. A method for determining radio resource usage, the method comprising a network node:
   associating a bearer of a terminal device with a target bitrate;
   acquiring historical radio resource usage and historical bitrate information for the bearer;
   acquiring an estimated spectral efficiency of the bearer, wherein the estimated spectral efficiency is based on at least one of the historical radio resource usage and the historical bitrate information for the bearer;
   acquiring a maximum radio resource usage; and
   determining radio resource usage of the bearer based on the target bitrate, the maximum radio resource usage, and the estimated spectral efficiency.

2. The method of claim 1, further comprising:
   acquiring radio measurements related to the bearer; and
   estimating the spectral efficiency of the bearer based on the acquired radio measurements.

3. The method of claim 2, wherein the acquired radio measurements are obtained by the network node, or received from either the terminal device or at least one other network node.

4. The method of claim 3, wherein all radio resources in the strict subset of radio resources are associated with almost blank subframes or reduced power subframes configurations of at least one cell in the network.

5. The method of claim 2, further comprising predicting bitrate per radio resource unit based on the acquired radio measurements of the terminal device.

6. The method of claim 1, wherein determining the radio resource usage comprises determining the radio resource usage as the minimum of the radio resource usage of the bearer based on the target bitrate, the estimated spectral efficiency, and the acquired maximum radio resource usage.

7. The method of claim 1, further comprising:
   aggregating the determined radio resource usage over a set of bearers; and
   generating a load estimate for the set of bearers based on the aggregated determined radio resource usage.

8. The method of claim 7, wherein the set of bearers is associated with a terminal device.

9. The method of claim 7, wherein the set of bearers is associated with a network node.

10. The method of claim 7, further comprising transmitting the load estimate to at least one other network node.

11. The method of claim 10, wherein one of the at least one other network node is a source network node of the terminal device.

12. The method of claim 1, wherein the radio resource usage is restricted to a strict subset of radio resources.

13. The method of claim 12, wherein all radio resources in the strict subset of radio resources are associated with common interference conditions.

14. The method of claim 1, further comprising:
   acquiring the bearer by receiving identification of the terminal device and bearer information from a network node of the terminal device; and
   evaluating whether or not a network node not serving the bearer can accommodate the bearer based on the received identification of the terminal device and the bearer information.

15. The method of claim 1:
   wherein the network node is a non-source network node of the terminal device
   further comprising:
      comparing the determined radio resource usage to radio resources available to the non-source network node; and
      signaling a handover capability of the bearer to a source network node of the bearer based on the comparison.

16. The method of claim 1, further comprising:
   predicting radio resource usage for at least one bearer served by the network node;
   comparing the predicted radio resource usage to current radio resource usage of the network node; and
   determining a load sharing action based on the comparison.

17. The method of claim 1, further comprising after handover of a bearer, transmitting the radio resource unit usage of the bearer to the network node and to the network node from which the bearer was handed over.

18. The method of claim 1, further comprising comparing the determined radio resource unit usage to the amount of available radio resources in a cell served by the network node.

19. The method of claim 1, further comprising:
   performing a load sharing action based on the determined radio resource usage of the bearer; and
   predicting a load in a cell served by the network node after having performed the load sharing action.

20. The method of claim 1, wherein the target bitrate is dependent on bearer state and type of bearer, the bearer state being switchable between an active state and an inactive state.

21. The method of claim 1, wherein the spectral efficiency of the bearer is provided as bits per radio resource unit.

22. The method of claim 1, further comprising determining a total load of a cell served by the network node as the number of required radio resource units needed to fulfil the target bitrate for all bearers in the cell.

23. A network node for determining radio resource usage, the network node comprising:
a processing circuit configured to:
associate a bearer of a terminal device with a target bitrate;
acquire historical radio resource usage and historical bitrate information for the bearer;
acquire an estimated spectral efficiency of the bearer, wherein the estimated spectral efficiency is based on at least one of the historical radio resource usage and the historical bitrate information for the bearer;
acquire a maximum radio resource usage; and
determine radio resource usage of the bearer based on the target bitrate, the maximum radio resource usage, and the estimated spectral efficiency.

24. A computer program product stored in a non-transitory computer readable medium for determining radio resource usage, the computer program product comprising software instructions which, when run on a processing circuit of a network node, causes the network node to:
associate a bearer of a terminal device with a target bitrate;
acquire historical radio resource usage and historical bitrate information for the bearer;
acquire an estimated spectral efficiency of the bearer, wherein the estimated spectral efficiency is based on at least one of the historical radio resource usage and the historical bitrate information for the bearer;
acquire a maximum radio resource usage; and
determine radio resource usage of the bearer based on the target bitrate, the maximum radio resource usage, and the estimated spectral efficiency.

* * * * *